US008980162B2

(12) United States Patent
Haesendonckx et al.

(10) Patent No.: US 8,980,162 B2
(45) Date of Patent: Mar. 17, 2015

(54) METHOD AND DEVICE FOR BLOW MOLDING CONTAINERS

(75) Inventors: Frank Haesendonckx, Hamburg (DE); Klaus Vogel, Barsbüttel (DE); Dirk Reimer, Norderstedt (DE)

(73) Assignee: KHS Corpoplast GmbH, Hamburg (DE)

( * ) Notice: Subject to any disclaimer, the term of this patent is extended or adjusted under 35 U.S.C. 154(b) by 719 days.

(21) Appl. No.: 12/311,895

(22) PCT Filed: Jul. 19, 2007

(86) PCT No.: PCT/DE2007/001285
§ 371 (c)(1),
(2), (4) Date: Aug. 3, 2009

(87) PCT Pub. No.: WO2008/046369
PCT Pub. Date: Apr. 24, 2008

(65) Prior Publication Data
US 2010/0314806 A1   Dec. 16, 2010

(30) Foreign Application Priority Data

Oct. 18, 2006   (DE) .................. 10 2006 049 163

(51) Int. Cl.
| | | |
|---|---|---|
| *B29C 49/64* | (2006.01) | |
| *B29C 49/68* | (2006.01) | |
| B29C 33/26 | (2006.01) | |
| B29C 49/06 | (2006.01) | |
| B29C 49/12 | (2006.01) | |
| B29C 49/36 | (2006.01) | |
| B29C 49/42 | (2006.01) | |
| B29L 31/00 | (2006.01) | |

(52) U.S. Cl.
CPC ............. *B29C 49/6436* (2013.01); *B29C 33/26* (2013.01); *B29C 49/06* (2013.01); *B29C 49/12* (2013.01); *B29C 49/36* (2013.01); *B29C 49/4205* (2013.01); *B29C 49/68* (2013.01); *B29L 2031/7158* (2013.01)
USPC ......................... 264/521; 264/519; 264/535

(58) Field of Classification Search
None
See application file for complete search history.

(56) References Cited

U.S. PATENT DOCUMENTS

| | | | |
|---|---|---|---|
| 6,692,684 B1 * | 2/2004 | Nantin et al. .................. | 264/521 |
| 2004/0113326 A1 * | 6/2004 | Gernhuber et al. ........... | 264/492 |

FOREIGN PATENT DOCUMENTS

| | | |
|---|---|---|
| AT | 412 543 | 4/2005 |
| DE | 23 52 926 | 4/1975 |
| DE | 42 12 583 | 10/1993 |
| DE | 199 06 438 | 8/2000 |
| DE | 101 16 665 | 10/2002 |
| WO | 02/087850 | 11/2002 |

\* cited by examiner

*Primary Examiner* — Monica Huson
(74) *Attorney, Agent, or Firm* — Lucas & Mercanti, LLP; Klaus P. Stoffel

(57) ABSTRACT

The method and the device serve for the blow molding of containers. A preform of a thermoplastic material is first subjected to thermal conditioning in the region of a heating section along a transporting path. Subsequently, the preform is transformed into the container inside a blow mold by the effect of blowing pressure. The thermal conditioning of the preforms is carried out by a number of radiant heaters positioned one above the other. The radiant heaters are activated during production in accordance with a first heating profile and activated during standby mode in accordance with a second heating profile (50), which is different from the first heating profile.

21 Claims, 8 Drawing Sheets

METHOD AND DEVICE FOR BLOW MOLDING CONTAINERS

The invention concerns a method for blow molding containers, in which a preform made of a thermoplastic material is subjected to thermal conditioning along a conveyance path in a heating line and then molded into a container in a blow mold by the action of blowing pressure, and in which the thermal conditioning is carried out by several radiant heaters arranged one above the other, which are activated by a control unit that presets at least one heating profile.

The invention also concerns a device for blow molding containers made of a thermoplastic material. This device comprises at least a heating line arranged along a conveyance path and a blowing station equipped with a blow mold. The heating line has at least one heating element with at least two radiant heaters that are arranged one above the other and are connected to a control unit that presets at least one heating profile.

In container molding by the action of blowing pressure, preforms made of a thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are grippers for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

Before a heating operation is carried out, the preforms are typically slipped onto transport mandrels, which either convey the preforms through the entire blow-molding machine or merely revolve within the heating system. In the case of vertical heating of the preforms in such a way that the mouths of the preforms are oriented vertically downward, the preforms are usually placed on a sleeve-like mounting element of the transport mandrel. In the case of suspended heating of the preforms, in which the mouths of the preforms are oriented vertically upward, expanding mandrels are usually inserted into the mouths of the preforms to clamp them tightly.

In carrying out container molding by blow molding, an essential task is to achieve a predetermined material distribution in the container wall. An important parameter for predetermining the material distribution that is obtained is the heat distribution realized in the preforms before the blow molding.

The heat distribution is typically realized in such a way that an even temperature level is produced in a circumferential direction of the preforms, while a temperature profile is produced in a longitudinal direction of the preforms. In addition, a suitable temperature profile through the wall of the preform from the outside to the inside is also predetermined. It can basically be assumed that regions of the preform with a lower temperature lead to thicker wall regions of the blow-molded container, while the warmer regions of the preform are stretched to a greater extent during the blow molding operation and thus lead to thinner wall regions of the blow-molded container.

Pyrometers can be used to measure temperatures both in the preforms and in the heating line.

The heating elements and individual radiant heaters used for heating the preforms are exactly adjusted mainly by manual means on the basis of an evaluation of the wall thickness distribution of the blow-molded containers. Due to the large number of heating elements arranged one after another in the direction of conveyance of the preforms and due to thermal equalization processes that take place, the adjustment is made adaptively and manually in an extensive test operation, in which settings of the heating elements are changed on an empirical basis, and the effects on the blow-molded containers are determined. A procedure of this type is generally very time-consuming. Moreover, when there are significant fluctuations of the ambient temperature or relative humidity, readjustments are often necessary.

It is also already known that the radiant heaters or heating elements can be coupled with a control unit, which automatically predetermines preselected temperature profiles. For example, it is possible to store different formulations for deforming preforms into containers in an operating console and to define the adjustment of the radiant heaters as part of these formulations. When an operator selects a certain formulation, the heating profile assigned to this formulation is then automatically generated by corresponding activation of the radiant heaters.

A special problem arises when the blow-molding machine is changed over from a production operation to a standby operation. During a changeover to a standby operation, the machine is allowed to run empty in an orderly way. All of the preforms still present in the machine receive their final thermal conditioning and are molded into containers. However, when the standby operation begins, no new preforms are fed to the machine.

Since preforms are no longer being heated in the heating line during the standby operation and thus heat is no longer being removed, it is necessary to reduce the heating power. In this regard, the heating power is typically reduced by a certain percentage. Before the production operation is started up again, the heating must be raised again, and an intended temperature distribution in the heating line must be guaranteed. This running up of the heating line requires a period of two to three minutes in prior-art systems. This lag time is determined by thermal inertia of the radiant tubes, the hot box housings, the hot box reflectors, and the reflectors installed opposite the hot boxes.

The objective of the present invention is to improve a method of the aforementioned type in such a way that the lag time between a standby operation and a production operation is reduced.

In accordance with the invention, this objective is achieved by virtue of the fact that the radiant heaters are activated according to a first heating profile during a production operation and according to a second heating profile that is different from the first heating profile during a standby operation.

A further objective of the present invention is to design a device of the aforementioned type in a way that is conducive to increased machine availability.

In accordance with the invention, this objective is achieved by virtue of the fact that the radiant heaters are coupled with a control unit that generates at least two different heating profiles, with a first heating profile being assigned to a production operation and a second heating profile being assigned to a standby operation.

The second heating profile, which is modified from the first heating profile, makes it possible to carry out an optimization of the temperature distribution in the heating line in such a way that the production operation can be started with only a short time delay. In contrast to the prior art, in which the heating profile is maintained and only the amplitude of the heating power distributed over the entire profile is uniformly reduced, a variation of the heating profile makes it possible systematically to avoid a temperature increase in those areas that tend to have a temperature increase when no preforms are passing through and to prevent excessive cooling in uncritical areas.

When an optimal choice of the second heating profile is made, the temperature distribution in the heating line is obtained by selective reductions of the heating power in individual profile regions that are different relative to one another. In accordance with an optimal profile adaptation, essentially the same temperature distribution is obtained within the heating line in the standby operation, when no preforms are introduced into the heating line, in relation to a production operation, and only the lacking heat removal due to the lacking preform throughput during standby operation is compensated.

Optimum temperature control is achieved especially due to the fact that the second heating profile generates a lower mean heating power than the first heating profile.

A dimensioning specification is provided by reducing the mean heating power of the second heating profile approximately by the mean heat absorption of the preforms per unit time while they are being heated.

In particular, it is provided that the second heating profile generates a mean temperature in the heating line that corresponds approximately to the temperature generated by the first heating profile during the heating of the preforms.

In another embodiment, during the standby operation, cooling air is blown more strongly against the conveyance elements on which the preforms are mounted than when a heating operation is being carried out on the preforms.

To reduce unwanted heating of the support elements, it has been found to be advantageous for radiant heaters that are arranged close to the support elements of the preforms to be operated during the standby operation with a greater power reduction than radiant heaters that are arranged far from the support elements.

It is possible to carry out cooling of the reflectors both when a production operation is being carried out and when a standby operation is being carried out.

In addition, it is provided that the radiant heaters are cooled.

To maintain predetermined temperatures exactly, it is useful to make a temperature measurement in the heating line. It has been found to be especially advantageous for the temperature in the heating line to be automatically controlled.

Additional temperature control possibilities are provided by controlling the temperature in the heating line by a combination of activations of the heating elements and cooling elements.

In accordance with a typical embodiment, it is provided that the blow-molding machine is operated together with a filling machine with which it is coupled.

Furthermore, it is possible for the blow-molding machine to produce the containers in an in-line operation.

In another variant of the invention, the blow-molding machine is operated together with a filling machine as a combined machine.

Specific embodiments of the invention are schematically illustrated in the drawings.

Figure 1:
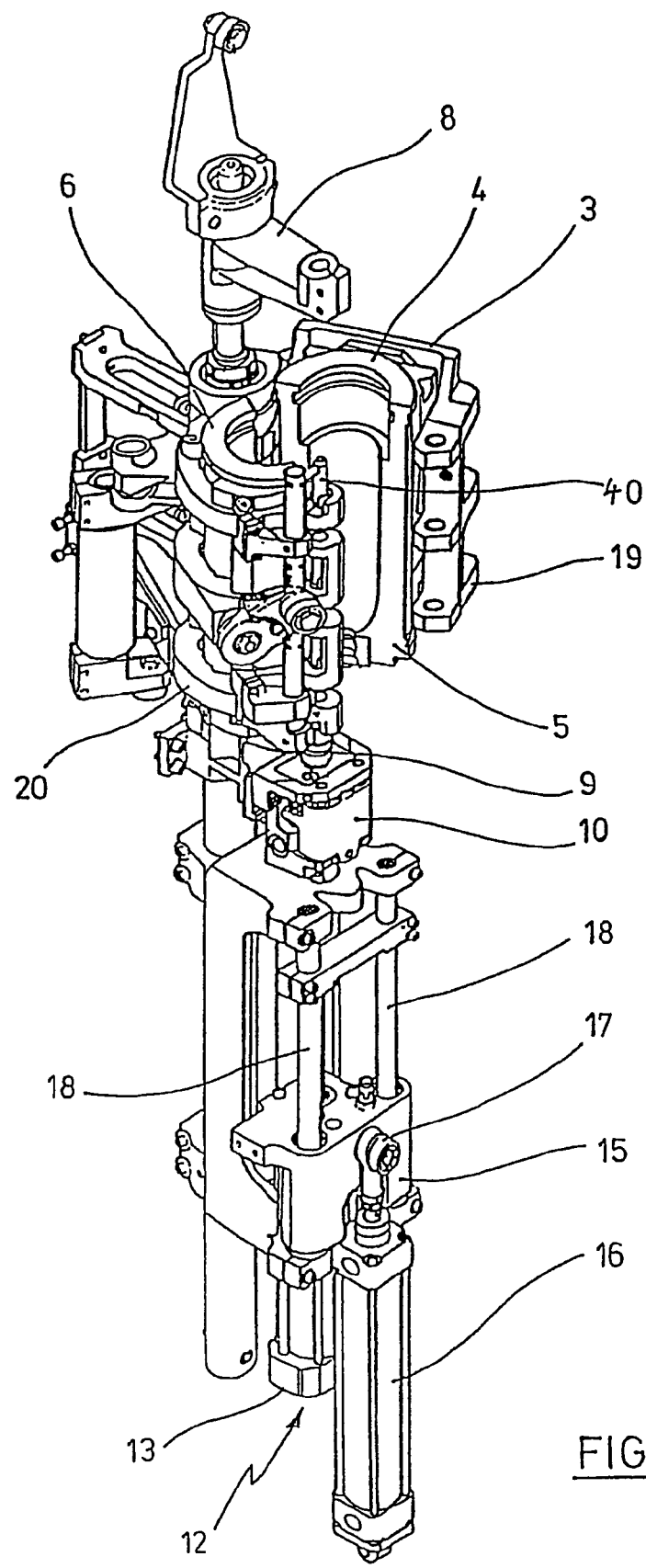
FIG. 1 shows a perspective view of a blowing station for producing containers from preforms.
Figure 2:
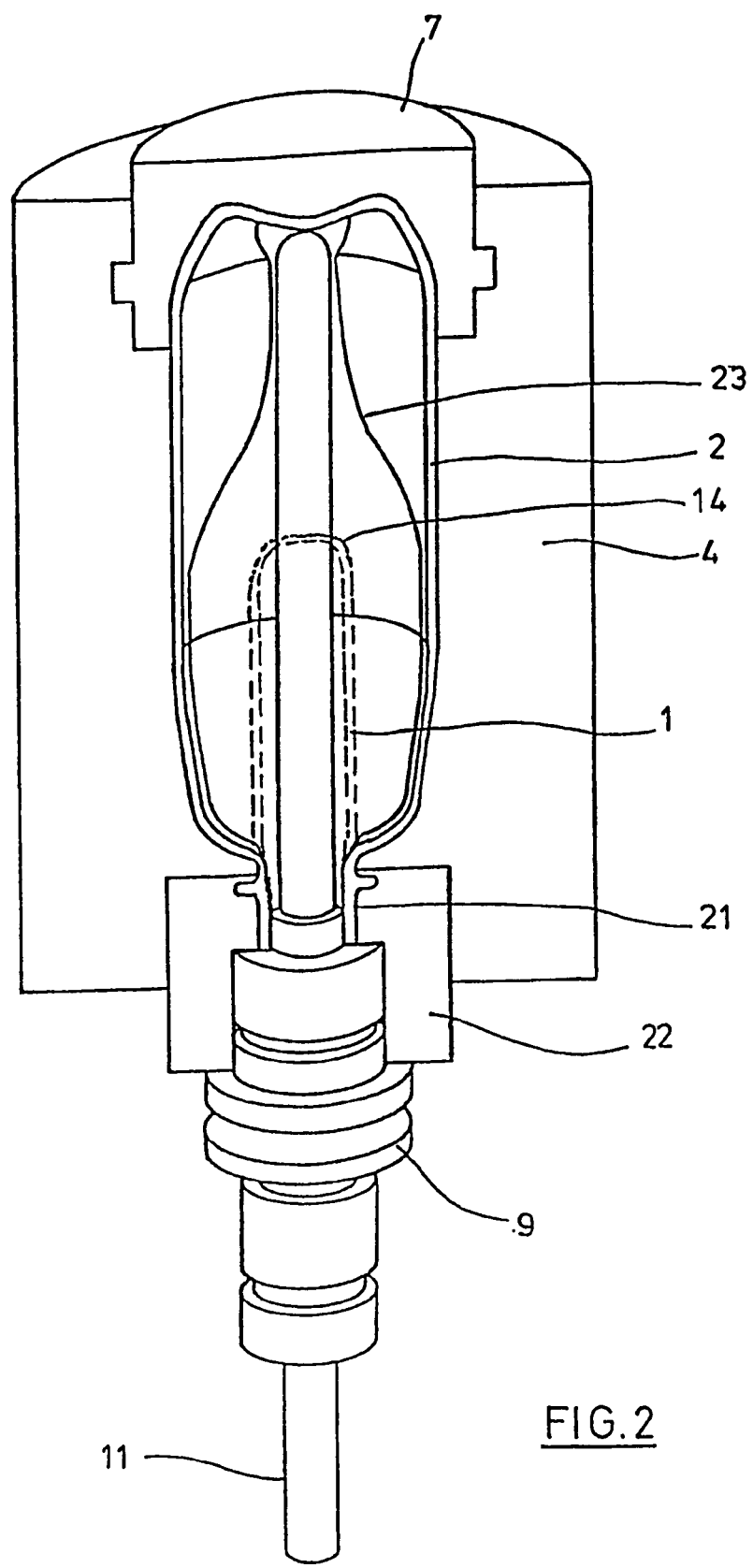
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a plurality of treatment stations within the device. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
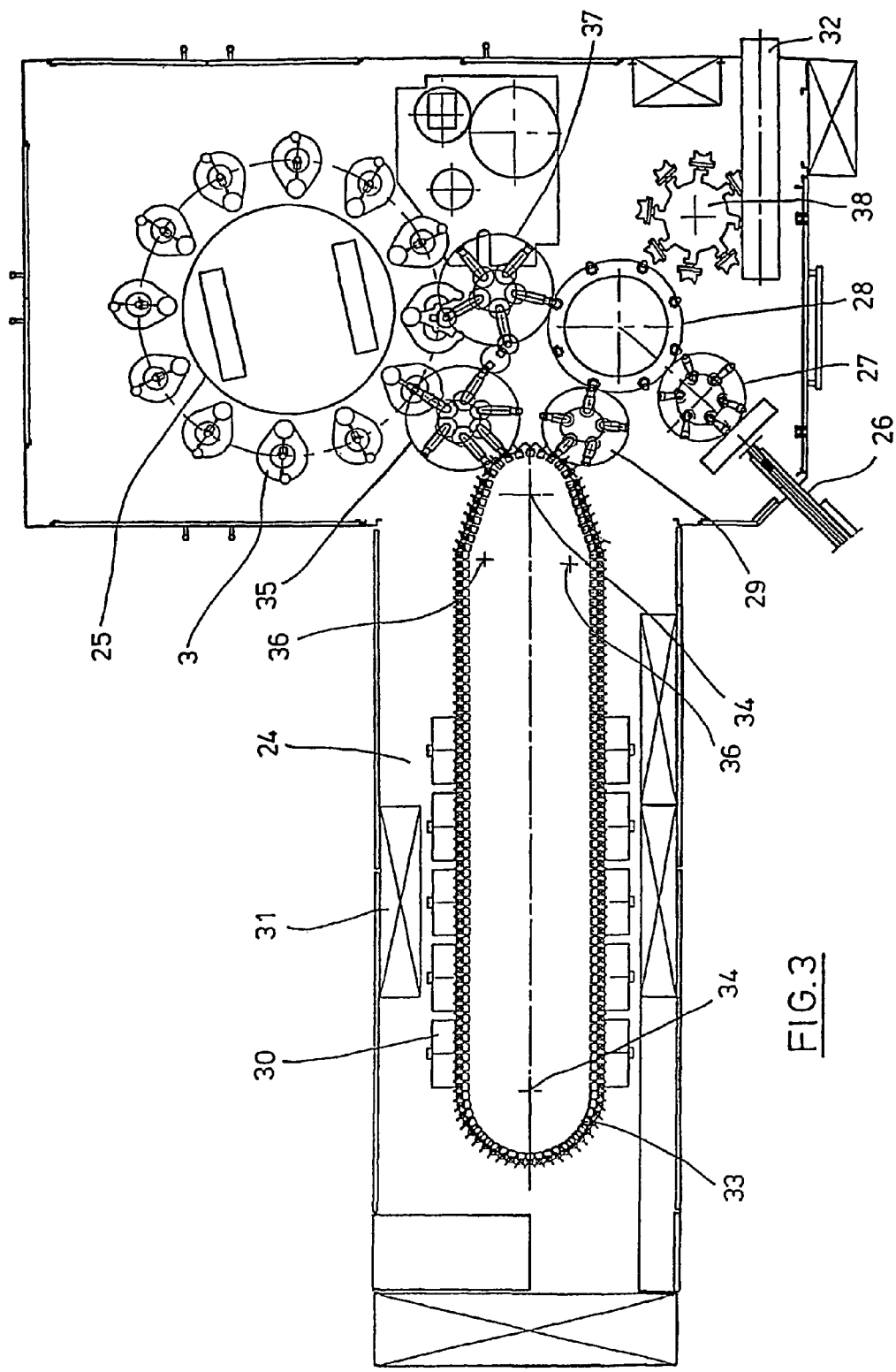
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Heating elements 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be formed into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material, for example, PET, PEN, or PP.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
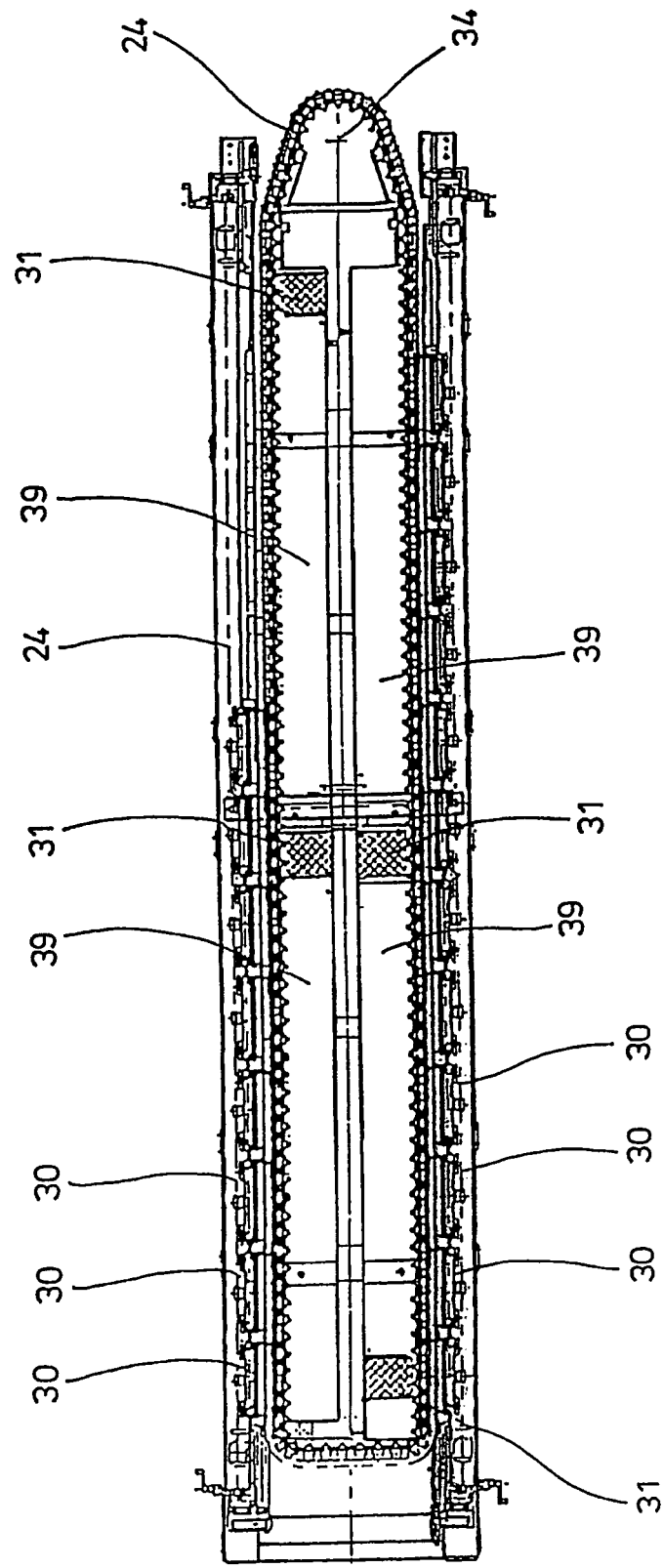
FIG. 4 shows a modified heating line with increased heating capacity.

In the modified heating line 24 illustrated in FIG. 4, a larger number of preforms 1 can be heated per unit time due to the larger number of heating elements 30. The fans 31 in this case feed cooling air into the area of cooling air ducts 39, which lie opposite the associated heating elements 30 and deliver the cooling air through discharge ports. A direction of flow of the cooling air essentially transverse to the direction of conveyance of the preforms 1 is realized by the arrangement of the discharge directions. In the area of surfaces opposite the heating elements 30, the cooling air ducts 39 can provide reflectors for the thermal radiation. It is also possible to realize cooling of the heating elements 30 by the delivered cooling air.

Figure 5:
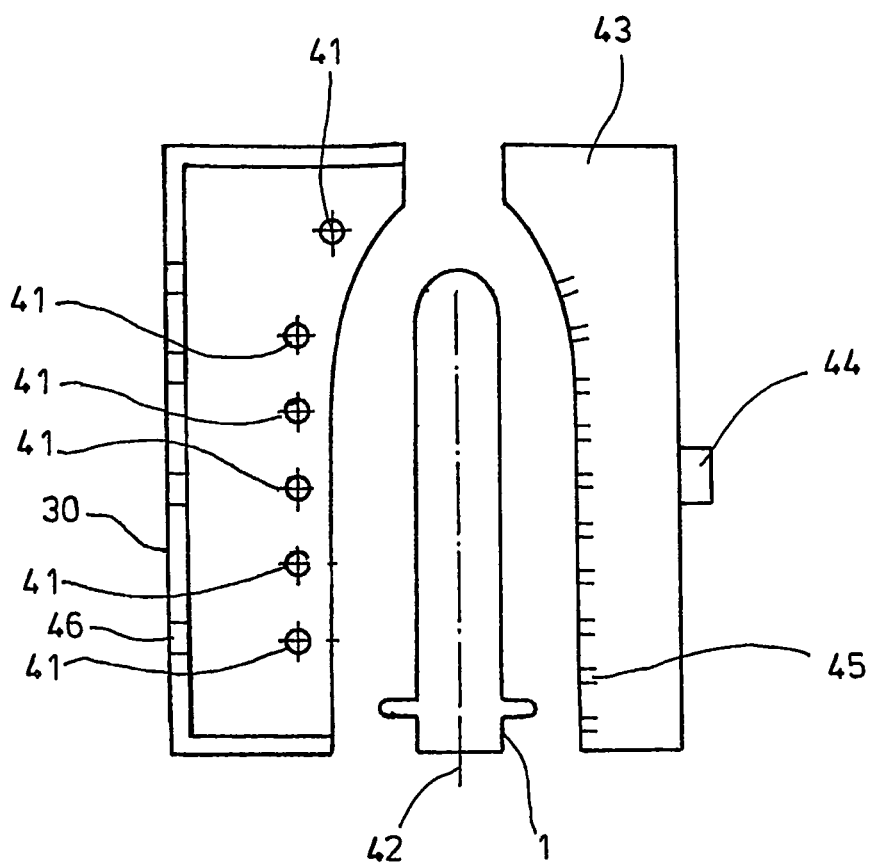
FIG. 5 shows a cross section through a heating element with a plurality of radiant heaters arranged one above the other and an associated preform.

FIG. 5 is a schematic drawing of a heating element 30 that is provided with a plurality of radiant heaters 41 arranged one above the other. With the use of the radiant heaters 41, it is possible to produce a predetermined temperature profile in the direction of a longitudinal axis 42 of the preform 1.

A reflector 43 is arranged opposite the heating element 30. The reflector 43 has a connection 44 for supplying cooling air. It is also possible to arrange discharge ports 45 in the reflector 43 to convey cooling gas in the direction of the surface of the preform 1. Discharge ports 46 for a cooling gas can be provided in the heating element 30 to provide cooling of the radiant heaters 41. The discharge ports 46 are connected with a cooling air supply (not shown).

Figure 6:
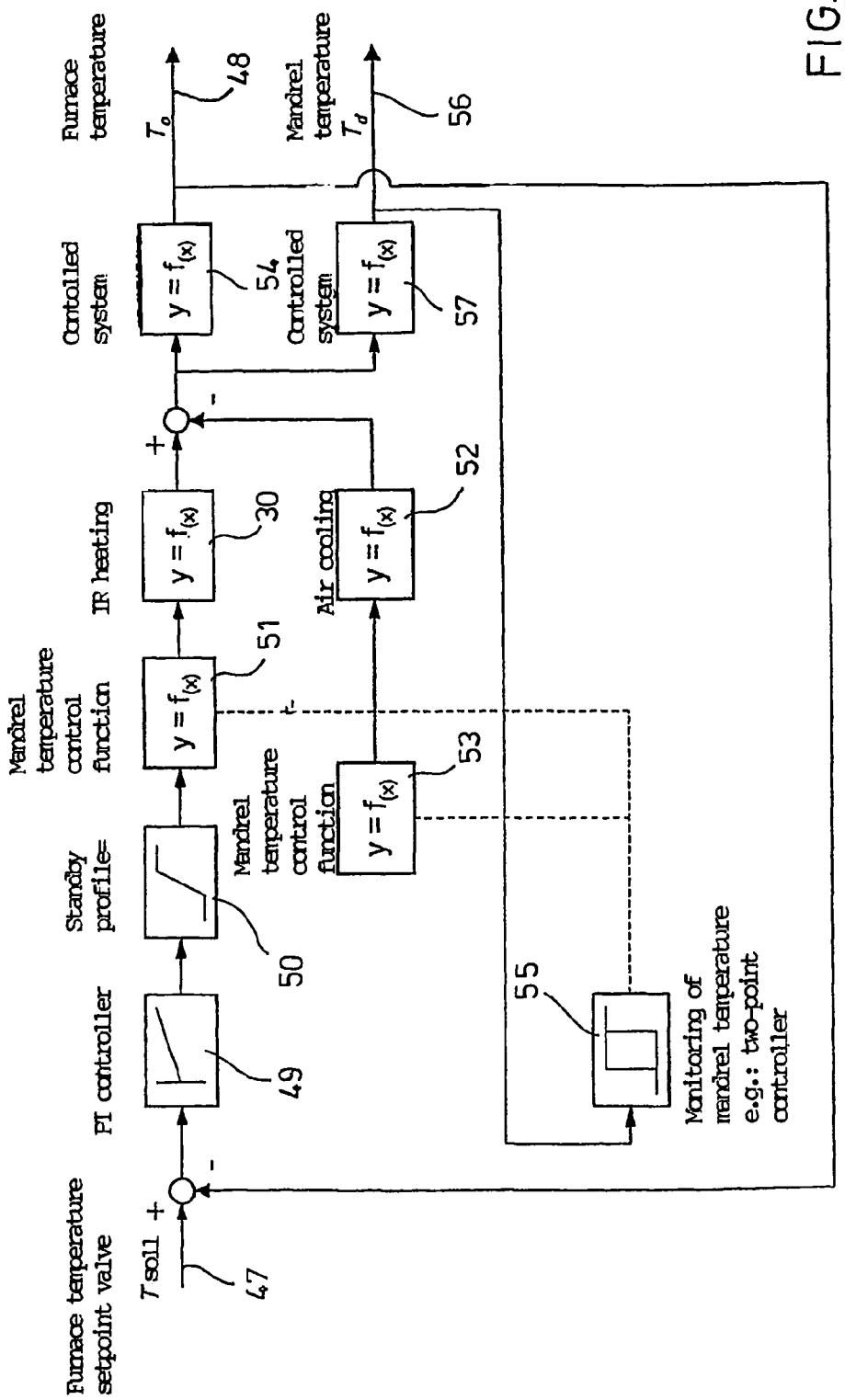
FIG. 6 shows a block diagram that illustrates the basic structure of the automatic control system.

FIG. 6 is a schematic representation of an automatic control system for presetting a suitable heater temperature in a standby operation. A temperature setpoint value 47 defines an optimum value for the temperature in the standby operation. It is advantageous to be able to adjust the temperature setpoint value 47 by an operator-controlled system of the blow-molding machine. The output variable of the closed-loop control system is the actual heater temperature 48. A control deviation derived from the temperature setpoint value 47 and the actual heater temperature 48 is supplied to a controller 49, which in the present embodiment is realized as a PI controller, which has both a proportional component and an integral component. The output value of the controller 49 is used to activate the individual radiant heaters 41 via a standby profile 50. In this regard, the radiant heaters 41 are activated especially in such a way that a given energy content in the heating line 24 remains constant at the individual heating levels.

Following the profile generation, a monitoring element 51 is provided for the purpose of monitoring the temperature of the preform mounting elements, by which the preforms 1 are conveyed through the heater. In the event of an impermissible temperature increase of the mounting elements, the monitoring element 51 acts on the given control signal. The output value of the monitoring element 51 is supplied to the respective radiant heaters 41 of the heating elements 30. In addition to heating with the use of the heating elements 30, active cooling can be provided in the heating line. For this purpose, a suitable cooling element 52 is coordinated by a control element 53. Temperature monitoring for the conveyance elements of the preforms 1 can also be realized in the control element 53. The actual temperature of the conveyance elements results from the difference of the radiant energy supplied and the quantity of heat removed by the air cooling. Accordingly, the heater temperature 48 is obtained from the difference between the output value of the heating elements 30 and the cooling elements 52 and from consideration of the dynamics of the controlled system 54 that is realized.

To control the temperature of the support elements for the preforms 1, a controller 55 is used, to which an actual temperature value of the conveyance elements is supplied. An output of the controller 55 acts on both the monitoring element 51 and on the control element 53. An actual temperature of the conveyance elements 56 is obtained from the difference of the output values of the heating elements 30 and the cooling element 52, taking the dynamics of an associated controlled system 57 into consideration.

Figure 7:
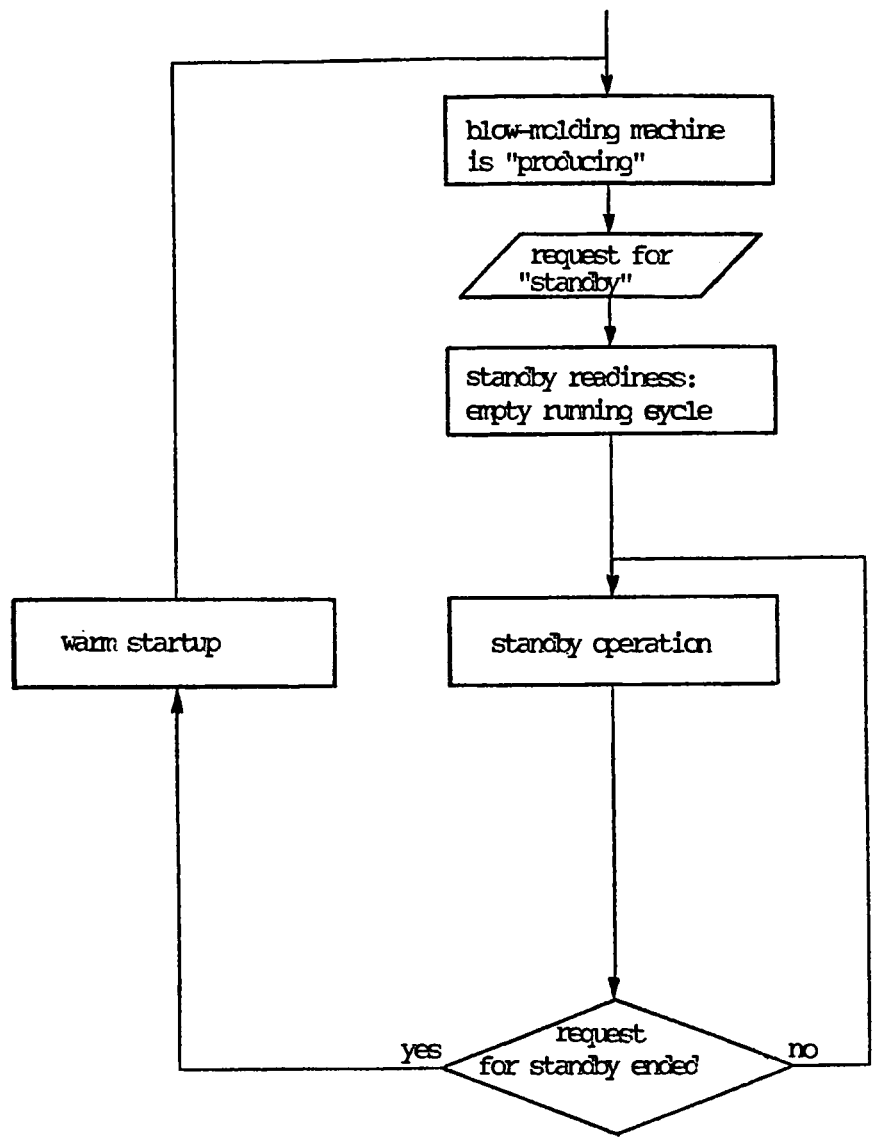
FIG. 7 shows a flow diagram for carrying out the method.
Figure 8:
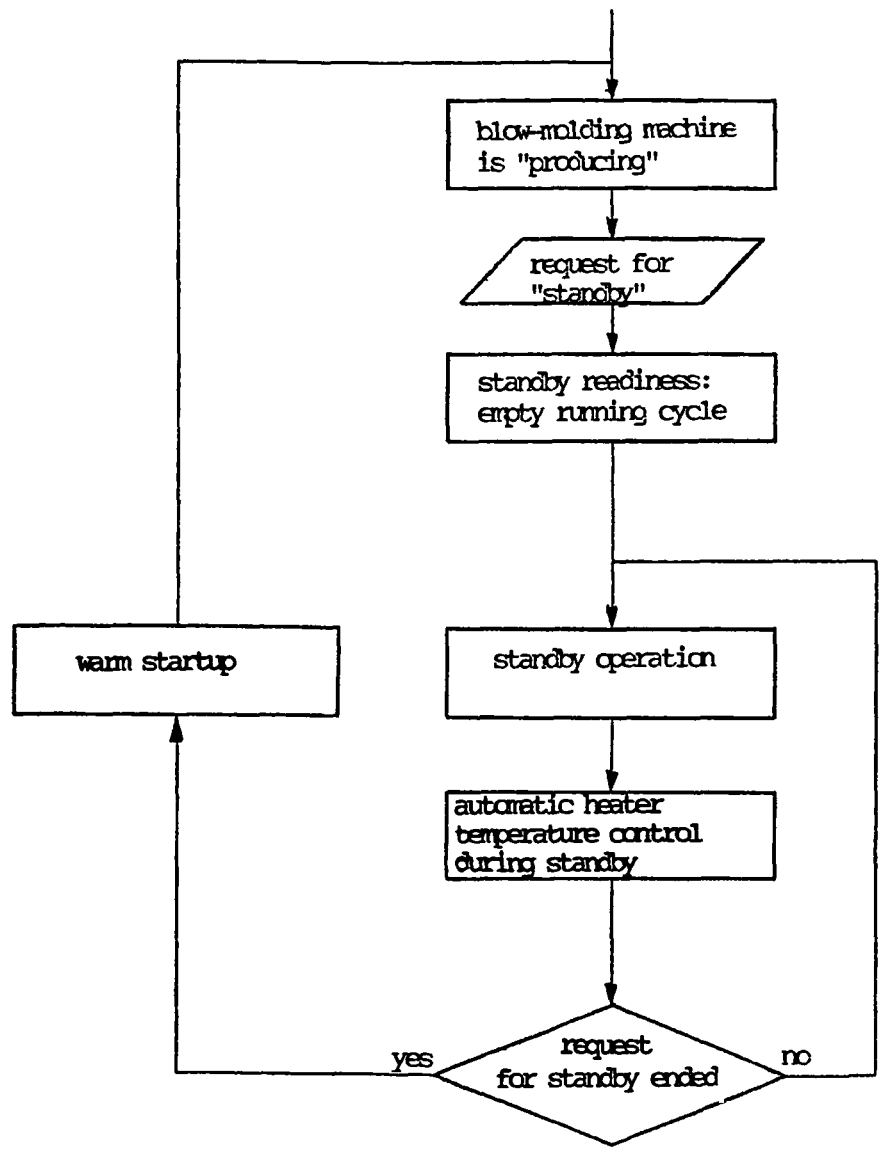
FIG. 8 shows a process flow diagram that is modified from the flow diagram in FIG. 7 with additional automatic control of the heater temperature.

FIG. 7 illustrates the process sequence for carrying out the temperature predetermination during standby operation as part of a temperature control system. FIG. 8 shows a modified process sequence which takes automatic control of the heater temperature into consideration during standby operation.

In accordance with one embodiment of the invention, cooling air directed towards the mouth section 21 of the preform 1 during standby operation is varied differently from cooling air directed towards other areas of the walls of the preform 1. The temperature in the heater is preferably measured with a temperature sensor, which is arranged in such a way that it is not positioned in the flow field of the cooling air introduced into the heater but rather detects the actual heater temperature.

The invention claimed is:

1. A method for blow molding containers, in which a preform made of a thermoplastic material is subjected to thermal conditioning along a conveyance path in a heating line and then molded into a container in a blow mold by the action of blowing pressure, and in which the thermal conditioning is carried out by several radiant heaters arranged one above the other, which are activated by a control unit that presets at least one heating profile, wherein the radiant heaters (41) are activated according to a first heating profile during a production operation and according to a second heating profile that is different from the first heating profile during a standby operation, wherein during the standby operation no preforms in the region of the heating line are heated and no preforms are introduced into the heating line, the second heating profile providing a different distribution of heating power in the region of the heating line compared to the first heating profile.

2. A method in accordance with claim 1, wherein the second heating profile generates a lower mean heating power than the first heating profile.

3. A method in accordance with claim 1, wherein the mean heating power of the second heating profile is reduced approximately by the mean heat absorption of the preforms (1) per unit time while they are being heated.

4. A method in accordance with claim 1, wherein the second heating profile generates a mean temperature in the heating line (24) that corresponds approximately to the temperature generated by the first heating profile during the heating of the preforms (1).

5. A method in accordance with claim 1, wherein, during the standby operation, cooling air is blown more strongly against the conveyance elements on which the preforms (1) are mounted than when a heating operation is being carried out on the preforms (1).

6. A method in accordance with claim 1, wherein, during the standby operation, radiant heaters (51) that are arranged close to the support elements of the preforms (1) are operated with a greater power reduction than radiant heaters (41) that are arranged far from the support elements.

7. A method in accordance with claim 1, further comprising reflectors (43) that are cooled.

8. A method in accordance with claim 1, wherein the radiant heaters (41) are cooled.

9. A method in accordance with claim 1, wherein a temperature measurement is made in the heating line (41).

10. A method in accordance with claim 1, wherein the temperature in the heating line (24) is automatically controlled.

11. A method in accordance with claim 1, wherein the temperature in the heating line (24) is controlled by a combination of activations of heating elements (30) and cooling elements (52).

12. A method in accordance with claim 1, wherein the blow-molding machine is operated together with a filling machine with which it is coupled.

13. A method in accordance with claim 1, wherein the blow-molding machine produces the containers (2) in an in-line operation.

14. A method in accordance with claim 1, wherein the blow-molding machine is operated together with a filling machine as a combined machine.

15. A method in accordance with claim 1, wherein the method is carried out using a device comprising: the heating line arranged along the conveyance path of the preform; and a blowing station with a blow mold, in which device the heating line has at least one heating element with the at least two radiant heaters arranged one above the other, and in which device the radiant heaters are connected to the control unit that presets the at least one heating profile, wherein the radiant heaters (41) are coupled with a control unit that generates the at least two different heating profiles.

16. A method in accordance with claim 15, wherein cooling elements are arranged in the heating line (24), which blow cooling gas against the conveyance elements on which the preforms (1) are mounted.

17. A method in accordance with claim 15, wherein at least one radiant heater (41) arranged close to the conveyance element of the preforms (1) has a lower heating power in standby operation than a radiant heater (41) that faces away from the conveyance element.

18. A method in accordance with claim 15, wherein the at least one heating element (30) is provided with a cooling system.

19. A method in accordance with claim 15, wherein the device includes at least one temperature sensor installed in the heating line (24).

20. A method in accordance with claim 15, wherein the control unit is part of a closed-loop control system.

21. A method in accordance with claim 15, wherein the device includes separate automatic control systems for the temperature in the heating line (24) and the temperature of the conveyance elements of the preforms (1).

\* \* \* \* \*